United States Patent [19]
Otomo et al.

[11] Patent Number: 6,064,519
[45] Date of Patent: *May 16, 2000

[54] ELECTRICALLY-DRIVEN COARSE AND FINE MOVEMENT APPARATUS

[75] Inventors: Masahiko Otomo, Fujisawa; Kazumasa Aoyama, Kawasaki, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/988,993

[22] Filed: Dec. 11, 1997

[30] Foreign Application Priority Data

Dec. 13, 1996 [JP] Japan .................................. 8-352883

[51] Int. Cl.⁷ .................................................. G02B 21/26
[52] U.S. Cl. ........................................... 359/392; 359/383
[58] Field of Search .................................... 359/368, 381, 359/382, 383, 391, 392

[56] References Cited

U.S. PATENT DOCUMENTS

| | | | |
|---|---|---|---|
| 4,653,878 | 3/1987 | Nakasato et al. | 359/381 |
| 4,930,882 | 6/1990 | Koch et al. | 359/392 |
| 5,260,825 | 11/1993 | Nagano et al. | 359/368 |
| 5,557,456 | 9/1996 | Garner et al. | 359/393 |
| 5,825,531 | 10/1998 | Otomo | 359/368 |

FOREIGN PATENT DOCUMENTS 8-166547  6/1996  Japan .

Primary Examiner—Cassandra Spyrou
Assistant Examiner—Mark A. Robinson
Attorney, Agent, or Firm—Vorys, Sater, Seymour and Pease LLP

[57] ABSTRACT

An electrically-driven coarse and fine movement apparatus comprises a movable member, a driving device for driving the movable member, a first operation handle, a first rotary shaft fixed to the first operation handle, a second operation handle, disposed coaxially with the first operation handle, for rotating the first rotary shaft, a rotation restricting member for restricting a rotation of the second operation handle, which is accompanied with the rotation of the first operation handle, a rotation detector for detecting a rotational quantity and a rotational direction of the first rotary shaft, a discriminating device, linked to the second operation handle, for judging whether the second operation handle is operated or not to output a judging signal, and a controlling circuit for controlling the driving device so as to provide the movable member with a coarse movement in accordance with an operation of one operation handle of the first and second operation handles and to provide the movable member with a fine movement in accordance with an operation of the other handle by judging whether the operation is a drive operation by the first operation handle or by the second operation handle on the basis of a detection signal from the rotation detector and the judging signal from the discriminating device.

10 Claims, 8 Drawing Sheets

FIG. 7

| OUT 1 | OUT 2 | OPERATION MODE |  |
|---|---|---|---|
| H | L | NORMAL ROTATION MODE | VREF 2 < VIN |
| H | H | CEASING MODE | VREF 2 ≦ VIN ≦ VREF 1 |
| L | H | REVERSE ROTATION MODE | VIN > VREF 1 |

ELECTRICALLY-DRIVEN COARSE AND FINE MOVEMENT APPARATUS

The entire disclosure of Japanese Patent Application No. 8-352883 including specification, claims, drawings and summary is incorporated herein by reference in its entirety.

BACKGROUND OF THE INVENTION

1. Field of the Invention

The present invention relates to an apparatus for electrically providing coarse and fine movements of a stage etc. of a microscope.

2. Related Background Art

A microscope has hitherto been provided with a stage for mounting a specimen thereon. This stage is operated in up-and-down directions (Z-directions) and right-and-left directions and front-and-back directions (XY directions), thus controlling a position of the specimen with respect to an observation optical system within the microscope. The stage operation in Z directions is executed through a Z operating device, while the stage operation in the XY directions is executed through an XY operating device.

In recent years, a great majority of microscopes are connected to computers and thus used. Accordingly, there must be increasingly the microscopes of such a type that the stage etc. is electrically driven by use of a motor.

In the beginning, this type of stage operating device was constructed as a push switch for driving the motor. A simple operation through the push switch might cause a sense of incongruity in operation to the user accustomed to the dial operation. In particular, this sense of incongruity increases in a device for providing coarse and fine movements of the stage in the up-and-down directions.

Such being the case, the present applicant proposed an electrically-driven stage coarse and fine movement apparatus in Japanese Patent Application Laid-Open No. 8-166547 U.S. patent application Ser. No. 08/569,394).

This apparatus is constructed of two shafts, i.e., a coarse movement shaft 51 driven by a coarse movement operation handle 50, and a fine movement shaft 53 driven by a fine movement operation handle 52. Then, an unillustrated first rotary encoder detecting unit detects a rotational quantity of a rotary encoder wheel 54 attached to the coarse movement shaft 51. Then, a control device controls the coarse movement on the basis of this detection signal. Further, an unillustrated second rotary encoder detecting unit detects a rotational quantity of a rotary encoder wheel 55 attached to the fine movement shaft 53. Then, the control device controls the fine movement of on the basis of this detection signal.

Further, in such a biaxial type of stage operating device, as illustrated in FIG. 8, the coarse movement operation handle 50 and the fine movement operation handle 52 are provided at both ends of the coarse movement shaft 51 and at both ends of the fine movement shaft 53. This is because a right or left direction from which the coarse and fine movement operation handles are operated, is unknown.

This type of earlier technology device requires, however, although capable of providing the coarse movement and the fine movement and exhibiting a good operability, two rotary encoder wheels and the detecting units in order to detect the respective rotational quantities of the two shafts. This might be a factor to increase a manufacturing cost of the stage operating device and particularly of the microscope. Further, it is required that the rotary encoder wheels be provided for the two shafts, and hence a comparatively large space in terms of dimension is needed, which might be a factor to hinder downsizing of the stage operating device.

Moreover, in the case of the coarse and fine movement apparatus being used for moving the stage up and down, an XY handle for operating the stage in the XY directions is separately provided.

As explained above, the coarse movement operation handle and the fine movement operation handle are provided at both ends of the coarse and fine movement apparatus, and therefore there must be a possibility in which the XY handle disposed beside the stage may interfere with the coarse and fine movement operation handles. In order to avoid this interference, the XY handle has hitherto been disposed in a position spaced away from the coarse and fine movement operation handles.

If the coarse and fine movement operation handles exist away from the XY handle, however, a decline in the operability is caused and demanded to be ameliorated in terms of human engineering.

Note that whether the XY handle is disposed on the right or left side with respect to the microscope body may be decided differently depending on the countries. A change in the specifications of the coarse and fine movement apparatus are varied according to the countries in accordance with the disposition of the XY handle, might be a large burden on a manufacturing process and on a management of product.

SUMMARY OF THE INVENTION

It is a first object of the present invention, which was contrived in view of the above problems inherent in the earlier technologies to provide an electrically-driven coarse and fine movement apparatus capable of detecting a coarse movement and a fine movement with a simple construction and exhibiting a high operability.

It is a second object to provide a microscope capable of giving a system construction as the user likes.

To accomplish the first object, an electrically-driven coarse and fine movement apparatus according to the present invention comprises a movable member, a driving device for driving the movable member, a first operation handle, a first rotary shaft fixed to the first operation handle, a second operation handle, disposed coaxially with the first operation handle, for rotating the first rotary shaft, a rotation restricting member for restricting a rotation of the second operation handle, which is accompanied with the rotation of the first operation handle, a rotation detector for detecting a rotational quantity and a rotational direction of the first rotary shaft, a discriminating device, linked to the second operation handle, for judging whether the second operation handle is operated or not to output a judging signal, and a controlling circuit for controlling the driving device so as to provide the movable member with a coarse movement in accordance with an operation of one operation handle of the first and second operation handles and to provide the movable member with a fine movement in accordance with an operation of the other handle by judging whether the operation is a drive operation by the first operation handle or by the second operation handle on the basis of a detection signal from the rotation detector and the judging signal from the discriminating device.

The first operation handle is disposed coaxially with the second operation handle, and, even when any one of these operation handles is rotated, the first rotary shaft rotates. The single rotation detector is provided to the first rotary shaft and detects a rotational quantity and a rotational direction of the rotary shaft. Which operation handle is operated can not, however, be known. Accordingly, the discriminating device detects that the second operation handle is operated. The second operation handle is not rotated by the rotation restricting member even when the first operation handle is rotated, and therefore it is possible to simply recognize which operation handle is operated. Thus, it is feasible to provide the electrically-driven coarse and fine movement apparatus capable of detecting the coarse movement and the fine movement with a simple construction and exhibiting a high operability.

To accomplish the second object, an electrically-driven microscope according to the present invention comprises a stage, a revolver for holding an objective lens, a driving device for moving at least one of the stage and the revolver in an optical-axis direction of the objective lens, and an operation unit attachable to and detachable from the microscope body. The operation unit comprises a coarse movement operation handle, a fine movement operation handle, a detecting device for detecting respectively an operation of the coarse movement operation handle and an operation of the fine movement operation handle, and outputting a detection signal indicating a piece of operation information, an outputting unit for outputting a signal from the detecting device, an inputting unit provided in the microscope body and connected to the outputting unit when the operation unit is attached to the microscope body, and a controlling circuit for controlling a drive of the driving device on the basis of a signal inputted to the inputting unit.

The operation unit is so constructed as to be attachable to and detachable from the microscope body. The operation unit outputs to the microscope body any one of a piece of operation information of the coarse movement operation handle and a piece of operation information of the fine movement handle. The microscope drives the driving device in accordance with signals thereof. Accordingly, a variety of configurations of the operation unit may be prepared corresponding to the constructions of the microscope. Further, the operation unit is detachable from the microscope body and is therefore easy for its maintenance.

Furthermore, if the coarse movement operation handle and the fine movement operation handle are concentrated on one side and attachable to the microscope body in any one of the right-and-left directions, the single operation can be used for a double purpose irrespective of a position of the XY handle.

BRIEF DESCRIPTION OF THE DRAWINGS

Other objects and advantages of the present invention will become apparent during the following discussion in conjunction with the accompanying drawings, in which:

FIG. 7 is a logic diagram of the discriminating circuit in FIG. 6; and

DESCRIPTION OF THE PREFERRED EMBODIMENTS

Figure 1:
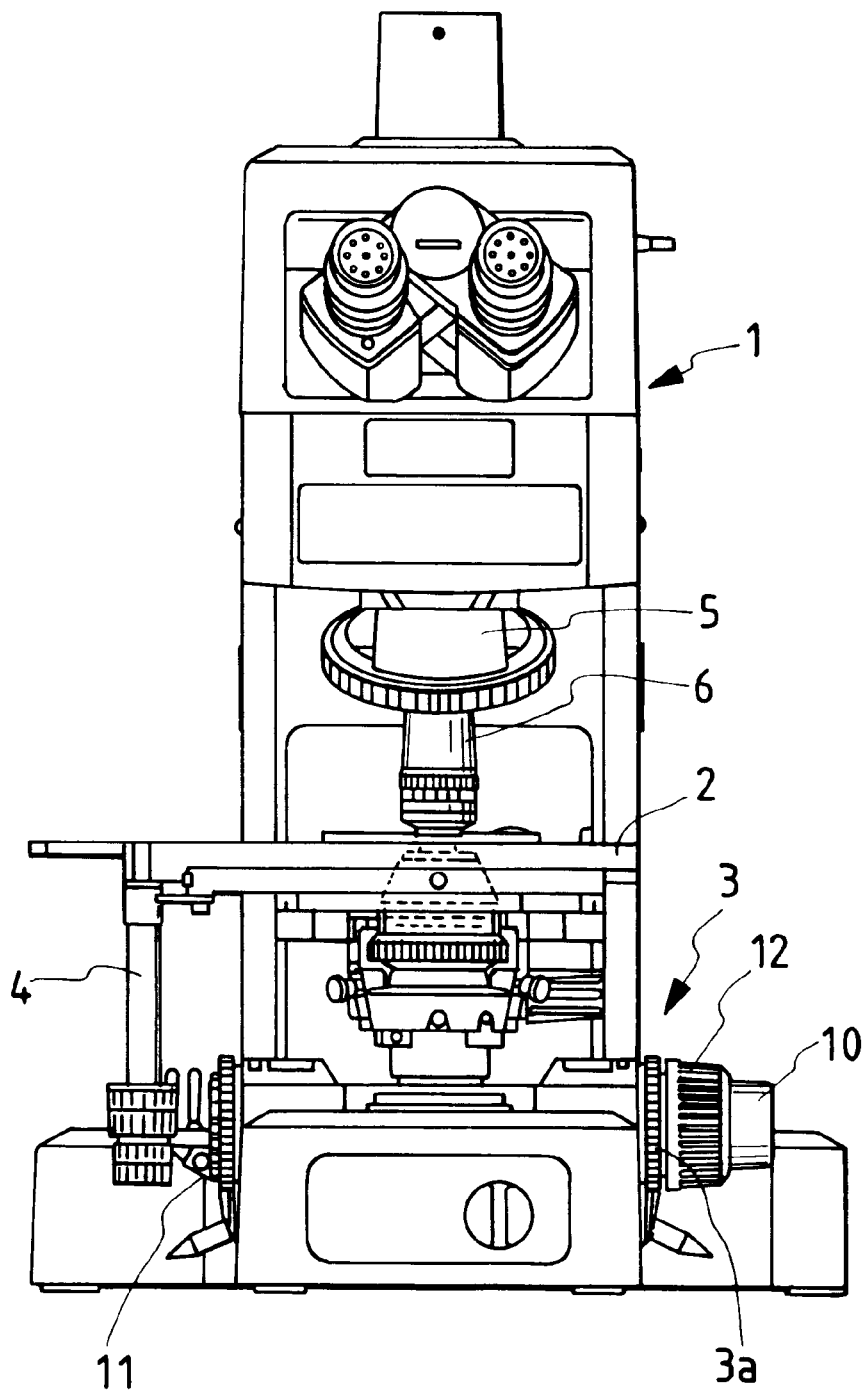
FIG. 1 is a front view showing a microscope in accordance with one embodiment of the present invention.
Figure 2:
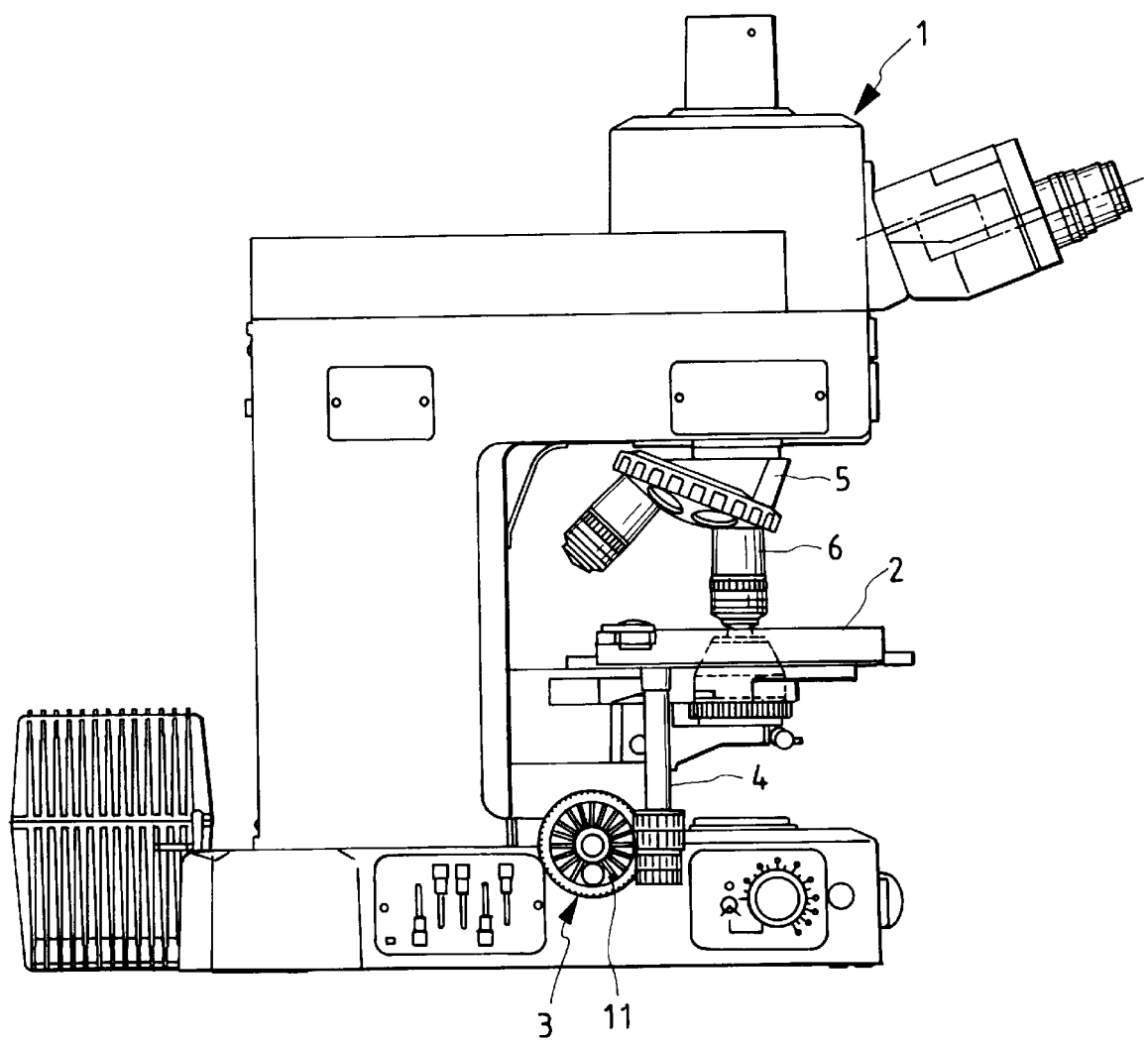
FIG. 2 is a side view showing a left part of the microscope FIG. 1.

One embodiment of an electrically-driven microscope according to the present invention will be described in detail with reference to the accompanying drawings. FIG. 1 is a front view of the microscope in this embodiment. FIG. 2 is a side view illustrating a left part of the microscope.

As shown in FIGS. 1 and 2, a microscope body 1 takes substantially U-shape consisting of a base member, support members and arm members. The support member of the microscope body 1 is provided with a stage mounted with a specimen. A left side edge of this stage 2 is provided with an XY handle 4 extending downward, which operates the stage 2 in the XY directions. The base member of the microscope body 1 is mounted with a stage operating device 3 for operating the stage 2 in up-and-down directions. The arm member is provided with a revolver 5 for holding an objective lens 6. An unillustrated motor for moving the stage 2 up and down in an optical-axis direction of the objective lens 6, is provided downwardly of the stage 2. This motor is driven by operating the stage operating device 3.

Figure 3:
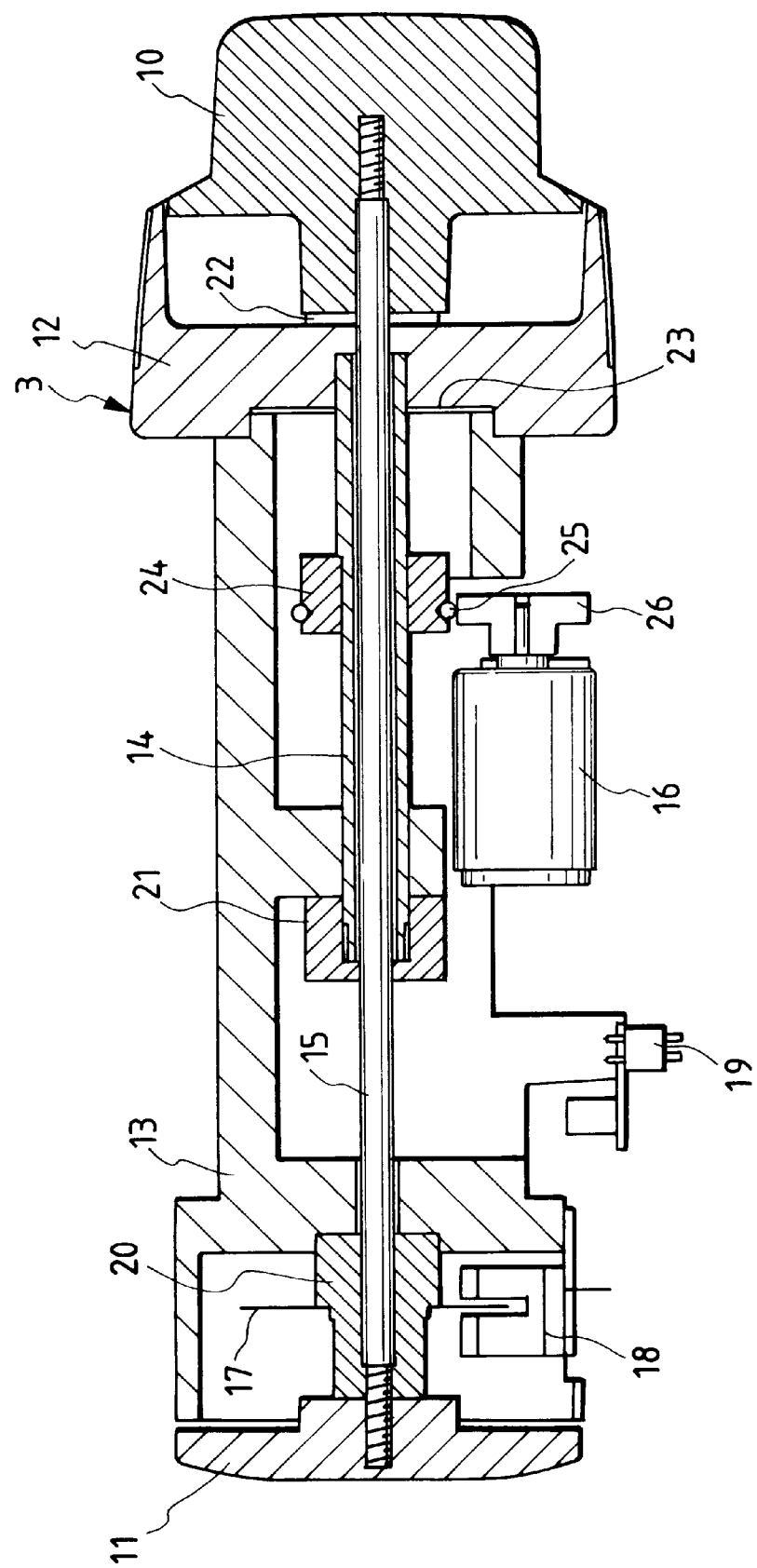
FIG. 3 is a vertical sectional view showing a stage operating device.

FIG. 3 is a vertical sectional view showing the stage operating device 3. As illustrated in FIG. 3, the stage operating device 3 is constructed of fine movement handles 10, 11, a coarse movement handle 12, a drum body 13 taking a substantially cylindrical shape, a coarse movement shaft 14, a fine movement shaft 15, a DC motor 16, a rotary encoder cord wheel 17, a rotary encoder detecting unit 18 and a connector 19. The drum body 13 is provided with the fine movement handles 10, 11, the coarse movement handle 12, the coarse movement shaft 14, the fine movement shaft 15, the DC motor 16, the rotary encoder cord wheel 17, the rotary encoder detecting unit 18 and the connector 19.

As shown in FIG. 3, both of the coarse movement handle 12 and the fine movement handle 10 are provided on one side of the stage operating device 3 in a longitudinal direction, and, on the other side thereof, only the fine movement handle 11 is provided.

As illustrated in FIG. 1, the side on which the coarse movement handle 12 and the fine movement handle 10 of the stage operating device 3 are provided, is set on the right side as viewed from the front of the microscope body 1. This is because the XY handle 4 is provided on the left side as viewed from the front of the microscope body 1. The XY handle 4 might be provided on the right side in some cases, and hence the stage operating device 3 can be installed on the left side by rotating, through 180°, the side on which the coarse movement handle 12 and the fine movement handle 10 are provided.

Only the fine movement handle 11 is provided on one side of the stage operating device 3, and a quantity of protrusion of the fine movement handle 11 from the drum body 13 is comparatively small. Therefore, the fine movement handle 11 can be disposed in a position much closer to the XY handle 4 without interfering with the XY handle 4. Hence, an operability of the microscope is very ameliorated.

Whether the stage operating device 3 should be mounted in a direction (a first direction) shown in FIG. 1 or a second direction when rotated through 180°, is determined in consideration of an interference of the coarse movement handles with the XY handle 4. Namely, as shown in FIG. 1, the stage operating device 3 is mounted in such a direction that the fine movement handle 10 largely protruding sideways and the XY handle 4 are in positions opposite to each other in the right-and-left directions. The reference numeral 3a designates a clamp handle for coarse movement for clamping the coarse movement handle 12 to suppress a motion accompanying a fine movement.

The fine movement shaft 15 is a rotary member penetrating the drum body 13 in the longitudinal direction of the drum body 13, and is fixed rotatably to the drum body 13 through a fine movement shaft fixing member 20. The fine movement handle 10 is fixed to one end of the fine movement shaft 15, and the fine movement handle 11 is fixed to the other end thereof. The fine movement shaft 15 is so constructed as to rotate even when any one of these fine movement handles 10, 11 is rotated. Further, this fine movement shaft 15 is, though a detailed explanation will be given later on, so constructed as to rotate even when the coarse movement handle 12 is rotated.

The coarse movement shaft 14 is a hollowed member, disposed coaxially with the fine movement shaft 15, into which the fine movement shaft 15 is rotatably inserted. The coarse movement shaft 14 is fixed rotatably to the drum body 13 through the coarse movement shaft fixing member 21. The coarse movement handle 12 is fixed to one end of the coarse movement shaft 14, and the other end thereof is set within the coarse movement shaft fixing member 21 without being linked to any kinds of handles.

Herein, in accordance with this embodiment, the coarse movement shaft 14 is so constructed as to rotate as far as the coarse movement handle 12 is rotated, and the fine movement shaft 15 is so constructed as to rotate even when any one of the fine movement handles 10, 11 and the coarse movement handle 12 is rotated. This construction will hereinafter be described.

To start with, a wave washer 22 serving as a linkage member for rotating the fine movement handle 10 with rotations of the coarse movement handle 12, is interposed between the fine movement handle 10 and the coarse movement handle 12. Further, a wave washer 23 serving as a restricting member for restricting the coarse movement handle 12 from rotating with the rotations of the fine movement handle 10, is interposed between the coarse movement handle 12 and the drum body 13.

Herein, a contrivance is that a frictional force between the coarse movement handle 12 and the drum body 13 becomes larger than a frictional force between the coarse movement handle 12 and the fine movement handle 10 by adequately selecting materials and thicknesses of the wave washers 22, 23.

Accordingly, when rotating the fine movement handle 10, the coarse movement handle 12 does not rotate against the frictional force caused between the drum body 13 and the coarse movement handle 12 itself. Reversely, when rotating the coarse movement handle 12, the fine movement handle 10 rotates following after the coarse movement handle 12. This leads to such an implication that the coarse movement shaft 14 rotates as far as the coarse movement handle 12 is rotated, and that the fine movement shaft 15 rotates even when any one of the coarse movement handle 12 and the fine movement handles 10, 11 is rotated.

The rotary encoder cord wheel 17 and the rotary encoder detecting unit 18 are rotation detecting mechanisms for detecting a rotational quantity and a rotational direction of the fine movement shaft 15. The rotary encoder cord wheel 17 is fixed to the fine movement shaft fixing member 20 and rotates together with the fine movement shaft 15. Further, a rotational quantity and a rotational direction of the rotary encoder cord wheel 17 are detected by the rotary encoder detecting unit 18 linked to the rotary encoder cord wheel 17, whereby pulse signals (a phase-A signal and a phase-B signal) corresponding to these rotational quantity and direction are generated. Herein, as explained above, the fine movement shaft 15 rotates even when any one of the coarse movement handle 12 and the fine movement handles 10, 11 is rotated, and hence the rotary encoder detecting unit 18 detects all of rotational quantities and rotational directions of the coarse movement handle 12 and the fine movement handles 10, 11.

Further, the DC motor 16 is defined as a rotation signal outputting mechanism, linked via the coarse movement shaft 14 to the coarse movement handle 12, for outputting a predetermined signal corresponding to the rotation of the coarse movement handle 12 linked thereto. The output of this signal is discussed herein. To begin with, a rubber ring fitting member 24 is secured to an outer peripheral portion of the coarse movement shaft 14, and rotates together with the coarse movement shaft 14. An outer peripheral portion of the rubber ring fitting member 24 is formed with a rubber ring fitting groove into which a rubber ring 25 is fitted. Then, a motor rotation fitting 26 fitted to a rotary shaft of the DC motor 16 is pushed against the above rubber ring 25.

Accordingly, the rotations of the coarse movement shaft 14 are transmitted to the rotary shaft of the DC motor 16 via the rubber ring fitting member 24, the rubber ring 25 and the motor rotation fitting 26. Thus, when the rotary shaft of the DC motor 16 rotates, an electromotive force having a certain value corresponding to a constant of a counter electromotive force of the DC motor 16 is generated in accordance with a rotating speed thereof.

Figure 4:
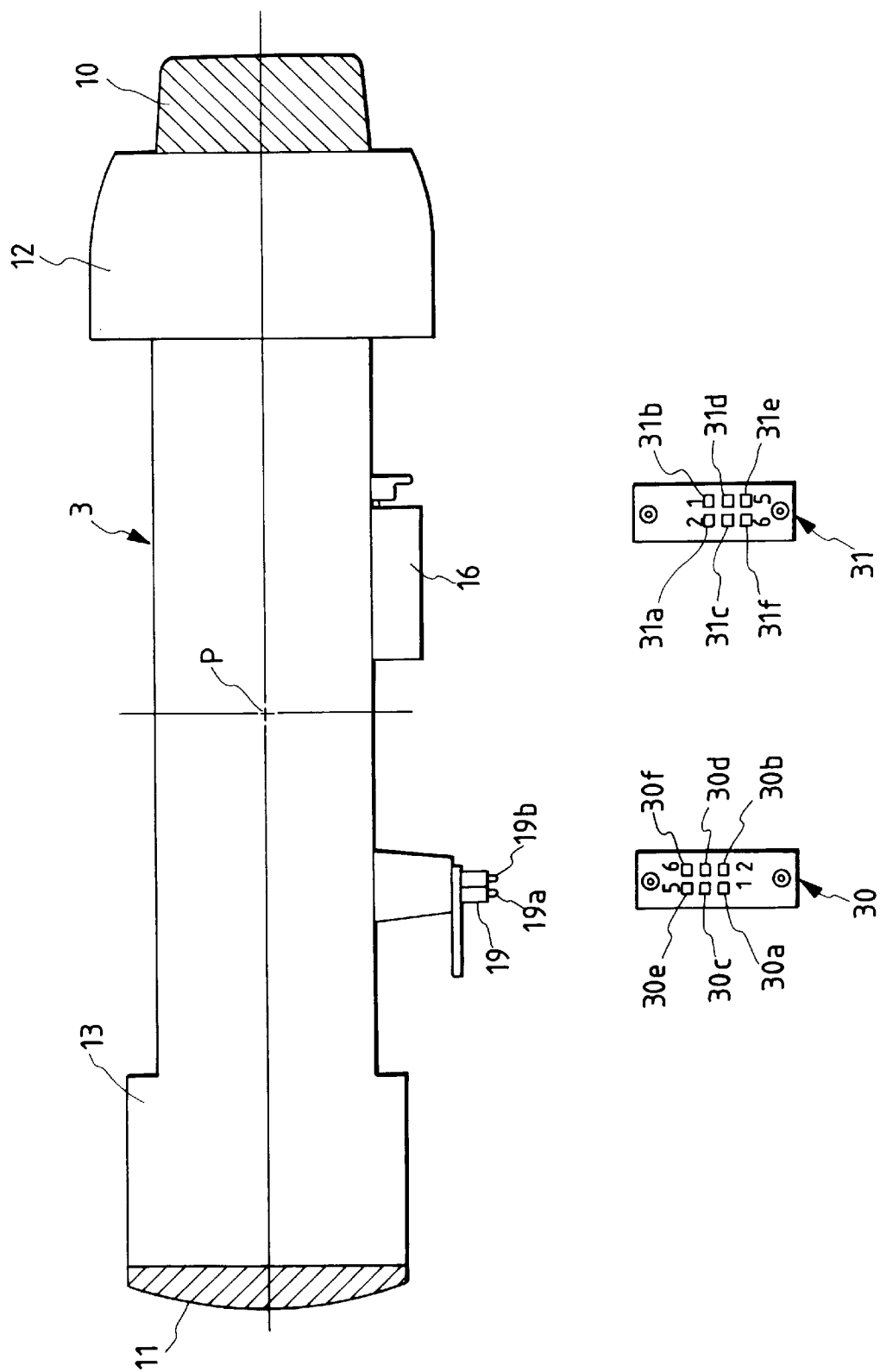
FIG. 4 is a conceptual diagram showing a relationship between an inputting mechanism of the microscope body and an outputting mechanism of the stage operating device.

Thus, the electromotive force generated by the DC motor 16 and the pulse signals generated as explained above by the rotary encoder detecting unit 18, are outputted to the microscope body 1 via the connector 19 defined as an outputting mechanism shown in FIGS. 3 and 4.

This connector 19 is disposed with a deviation (i.e., in an off-center position) from a central position in the right-and-left direction of the drum body 13, which position is indicated by a point P in FIG. 4. The connector 19 includes six pieces of terminals 19a–19f for outputting a plus (+) output and a minus (−) output of the DC motor 16, and the phase-A and phase-B signals of the rotary encoder detecting unit 18 as well as being connected to a power supply and the ground. Note that only the terminals 19a and 19b are shown in FIG. 4, but those six terminals 19a–19f are disposed in two columns and three rows.

On the other hand, the microscope body 1, as illustrated in FIG. 4, includes a contact point board 30 defined as a first inputting unit and a contact point board 31 defined as a second inputting unit, which units serve as an inputting member connected to the connector 19. Of these boards, the contact point board 30 is disposed in a position corresponding to the connector 19 of the stage operating device 3 existing in the direction shown in FIG. 1. On the other hand, the contact point board 31 is disposed in a position corresponding to the connector 19 of the stage operating device 3 existing in the second direction.

Accordingly, if the stage operating device 3 is installed in the first direction shown in FIG. 1, the connector 19 can be connected to the contact point board 30. If the stage operating device 3 is installed in the second direction, the connector 19 can be connected to the contact point board 31. With this arrangement, even when the stage operating device 3 is installed in any one of the first direction and the reversed direction thereto in accordance with the position of the XY handle 4, the outputting from the connector 19 to the microscope body 1 can be done.

Those contact point boards 30, 31 are provided with six pieces of terminals 30a–30f and six pieces of terminals 31a–31f respectively corresponding to the six terminals 19a–19f of the connector 19 as shown in FIG. 4. These terminals 30a–30f and 31a–31f connected to the terminals 19a–19f serve to input the plus and minus outputs of the DC motor 16, and the phase-A and phase-B signals of the rotary encoder detecting unit 18 and are connected to the power supply and the ground as well.

Herein, the connector 19 is reversed in terms of its up-and-down relationship and right-and-left relationship if the stage operating device 3 is installed in the first direction shown in FIG. 1 or in the second direction. Therefore, as illustrated in FIG. 4, the terminals 30a–30f and the terminals 31a–31f are in principle set in layouts reverse to each other with respect to their up-and-down portions and right-and-left portions.

In this embodiment, however, as illustrated in FIG. 4, the terminals 30a–30d and the terminals 31a–31d are disposed so as not to reverse the right-and-left relationship to each other. That is, the signals inputted to the terminals 30a, 30b and the signals inputted to the terminals 31a, 31b, are reverse to each other. Further, the signals inputted to the terminals 30c, 30d and the signals inputted to the terminals 31c, 31d, are reverse to each other.

Accordingly, a relationship of the rotating direction of the coarse movement and fine movement handles (10, 11, 12) and the moving direction of the stage 2 is invariably same even when the stage operating device 3 is disposed in any one of the first and second directions.

Figure 5:
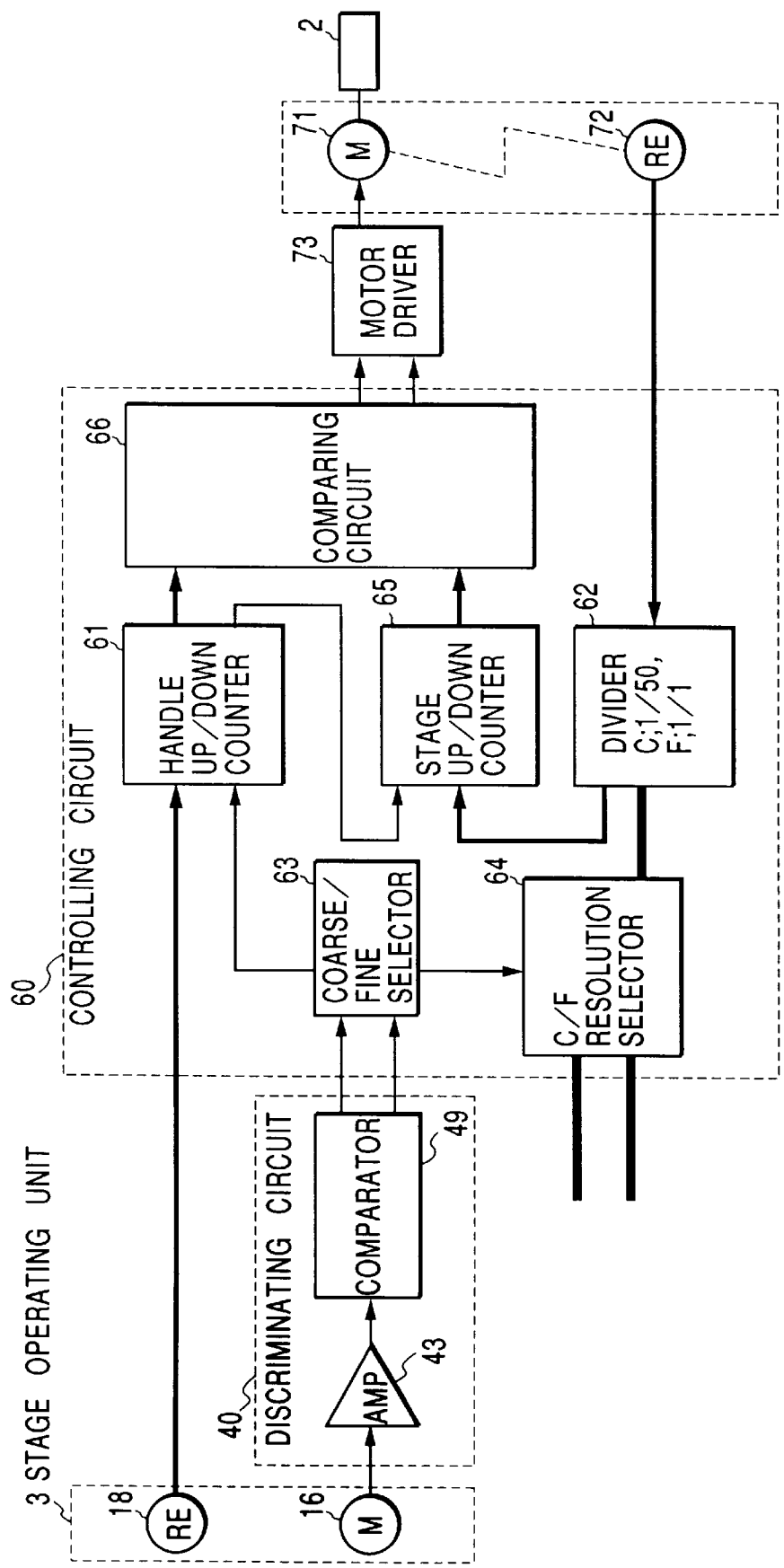
FIG. 5 is a block diagram showing a construction of a coarse and fine movement apparatus in the microscope in this embodiment.

Given next is an explanation of how the operation of the stage 2 is controlled based on the signal inputting to the microscope body 1. FIG. 5 is a block diagram showing a construction of the coarse and fine movement apparatus in the microscope in this embodiment.

The signal from the rotary encoder detecting unit 18 is outputted to a handle up/down counter 61 within a controlling circuit 60. Further, the signal from the DC motor 16 is outputted to the controlling circuit 60 via a discriminating circuit 40 provided in the microscope body 1. The discriminating circuit 40 includes an amplifier 43 and a comparator 49. The discriminating circuit 40 will hereinafter be described in greater detail.

The stage 2 is connected to a motor 71 and moved up and down with rotations of the motor 71. A rotary encoder 72 is connected to the motor 71 and detects rotations of the motor 71. Pulse signals (a phase-A signal and a phase-B signal) from the rotary encoder 72 are outputted to a divider 62 in the controlling circuit 60.

The controlling circuit 60 controls a drive of the motor 71 through a motor driver 73 in accordance with the signals coming from the rotary encoders 18, 72 and a signal from the discriminating circuit 40.

Figure 6:
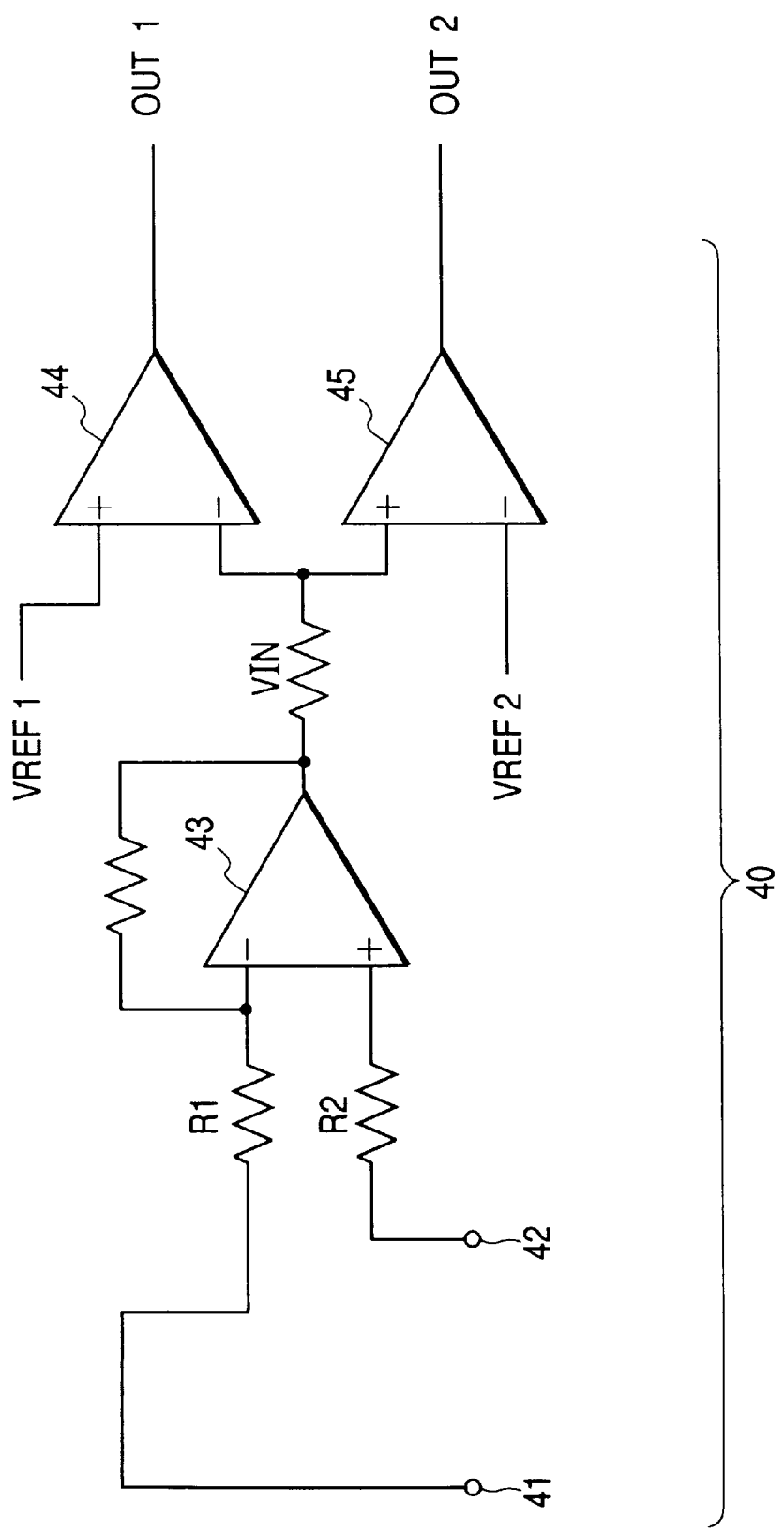
FIG. 6 is a circuit diagram of a discriminating circuit.
Figure 8:
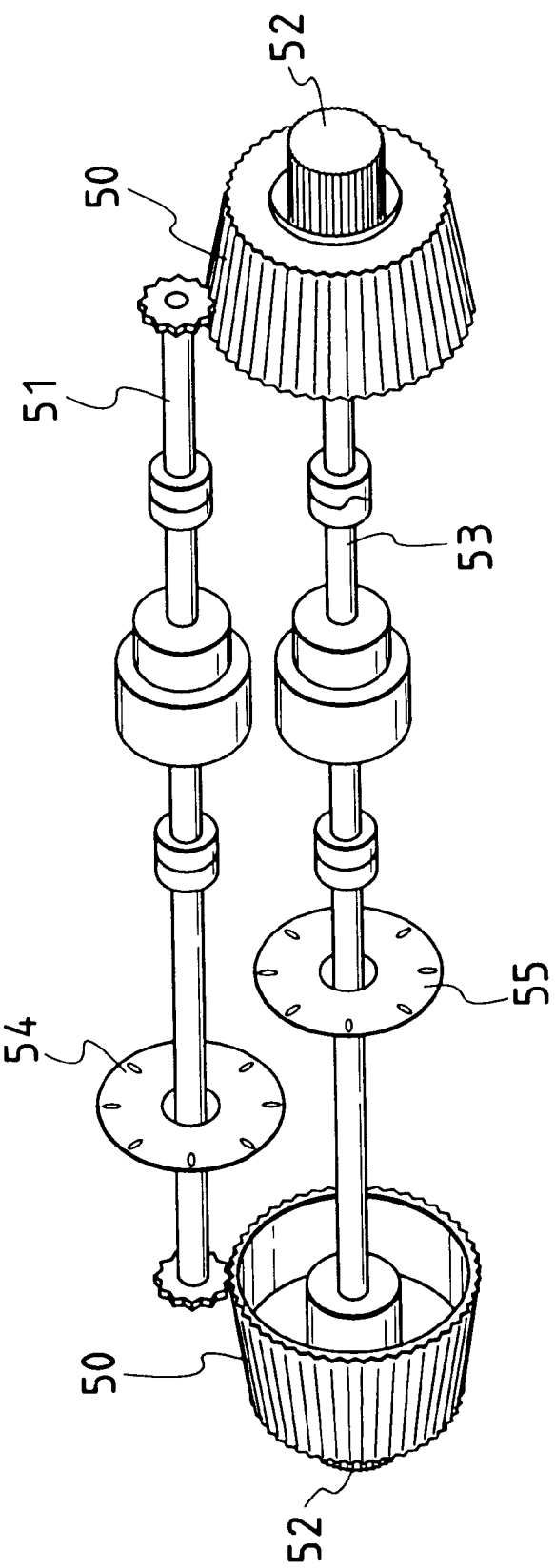
FIG. 8 is a diagram illustrating a mechanism of the principal portion of an earlier technology stage operating device.

FIG. 6 is a circuit diagram showing the discriminating circuit 40. FIG. 7 is a logic diagram of the discriminating circuit 40.

As shown in FIG. 6, at first, the plus output and the minus output of the DC motor 16 are connected to terminals 41, 42 of the discriminating circuit 40 so that a positive voltage is generated when the rotary shaft of the DC motor 16 rotates normally, and that a negative voltage is generated when reversely rotated. These positive and negative voltages are inversely amplified by the amplifier 43. Then, those voltages are thereafter converted into logic by window comparators 44, 45. The comparator 49 shown in FIG. 5 corresponds to the window comparators 44, 45 illustrated in FIG. 6.

A reference voltage VREF1 on the order of +0.5 V is applied to a plus terminal of the window comparator 44, and a reference voltage VREF2 on the order of −0.5 V is applied to a minus terminal of the window comparator 45.

Then, as shown in FIG. 7, when the rotary shaft of the DC motor 16 rotates normally, a relationship between an amplified electromotive force VIN to be inputted to the window comparators 44, 45 and the reference voltage VREF2 is VIN>VREF2 (−0.5 V). Then, an output level of an OUT1 is kept at an H level, while an output level of an OUT2 becomes an L level. These output signals are outputted to a coarse and fine movement selector 63 within the controlling circuit 60. The coarse and fine movement selector 63, when the output level of the OUT1 is the H level and the output level of the OUT2 is L level, judges that a mode is a normal rotation mode in which the coarse movement handle 12 is operated in a direction of the normal-rotation (46 in FIG. 7).

On the other hand, if the rotary shaft of the DC motor 16 reversely rotates, the relationship between the electromotive force VIN and the reference voltage VREF1 is VIN>VREF1 (+0.5 V). Then, the output level of the OUT1 becomes the L level, while the output level of the OUT2 becomes the H level. Thus, when the output level of the OUT1 is the L level and the output level of the OUT2 is the H level, the coarse and fine movement selector 63 judges that the mode is a reverse rotation mode in which the coarse movement handle 12 rotates in the reverse direction (48 in FIG. 7).

Further, if a relationship between the electromotive force VIN, and the reference voltages VREF1, VREF2 is expressed such as VREF2 (−0.5 V)≦VIN≦VREF1 (+0.5 V), the coarse and fine movement selector 63 judges that the mode is a ceasing mode in which the coarse movement handle 12 is not operated (47 in FIG. 7).

Namely, in the logic shown in FIG. 7, when in the normal rotation mode 46 or the reverse rotation mode 48, a judgement is that the coarse movement handle 12 is operated. In the case of the ceasing mode 47, the judgement is that the coarse movement handle 12 is not operated.

Note that whether the mode is the ceasing mode 47 or not may be judged in order to judge whether or not the coarse movement handle 12 is operated. There is not necessity for discriminating the normal rotation from the reverse rotation when operated. In accordance with this embodiment, however, the rotation of the coarse movement handle 12 is more sluggish than the rotations of the fine movement handles 10, 11, and, since the rotary encoder has a low resolution, it is impossible for the rotary encoder to precisely detect the rotating direction of the coarse movement handle 12. Accordingly, this can be compensated by the normal/reverse judgements by the logic.

A result of the judgement by the coarse and fine movement selector 63 is sent to a coarse and fine movement resolution selector 64. The coarse and fine movement resolution selector 64, when the signals from the coarse and fine movement selector 63 are the normal/reverse rotation modes, transmits to a divider 62 a command to select a dividing ratio of 1/50. Further, the coarse and fine movement resolution selector 64, if the signal from the coarse and fine movement selector 63 is the ceasing mode, transmits to the divider 62 a command to select a dividing ratio of 1/1. The divider 62, when the dividing ratio of 1/50 is selected and when the number of pulses of the rotary encoder 72 comes to 50 pulses, outputs one pulse to the stage up/down counter 65. By contrast, when the dividing ratio of 1/1 is selected, the divider 62 outputs the pulse signal of the rotary encoder 72 as it stands directly to the stage up/down counter 65.

The handle up/down counter 61 counts the number of pulses from the rotary encoder 18 and outputs count value to a comparing circuit 66. Further, the stage up/down counter 65 counts the number of pulses given from the divider 62 and outputs a count value to the comparing circuit 66. The comparing circuit 66 outputs a signal of normal or reverse rotation command to the motor driver so as to equalize the count values given from the handle up/down counter 61 and the stage up/down counter 65.

Moreover, the coarse and fine movement selector 63 transmits a reset signal of the count value to the handle up/down counter 61, corresponding to a switching process of the normal or reverse rotation mode and the ceasing mode. Subsequently, the handle up/down counter 61 transmits the reset signal of the count value to the stage up/down counter 65.

Namely, when judging that the coarse movement handle is operated even if the fine movement shaft 15 shown in FIG. 3 rotates by the same quantity, the stage 2 moves by a 50-fold quantity in comparison with a quantity when judging that the coarse movement handle is not operated. More specifically, when the fine movement handles (10, 11) are operated, the stage 2 moves 0.05 $\mu$m corresponding to one pulse of the rotary encoder 18, and moves 2.5 $\mu$m corresponding to one pulse of the rotary encoder 18 when the coarse movement handle 12 is operated.

Now, one embodiment of the present invention has been discussed so far. The present invention is not, however, limited to the embodiment discussed above but may be embodied in a variety of different modes within the scope of the technical concept of the present invention. These different modes will hereinafter be explained.

To begin with, in the embodiment discussed above, the stage operating device has been explained as a device for moving the stage 2 up and down. However, a revolver operating device for moving the revolver 5 up and down may also be applied. In this case, if the revolver 5 instead of the stage 2 is connected to the motor 71 in FIG. 5, other configurations are absolutely the same.

Further, the present invention may be applied for operating a stage of an arbitrary device other than the microscope. Furthermore, the stage operating device 3 may be not the device for moving the stage 2 up and down but a device for operating the stage in right-and-left directions or in other arbitrary directions.

Moreover, the one coarse movement handle is provided in the embodiment discussed above, however, there may be provided two coarse movement handles as in the prior art if the interference with the XY handle 4 is not considered. Further, the coarse movement handle and the fine movement handle may be provided on one side of the stage operating device, whereas no handle may be provided on the other side thereof.

Additionally, the discriminating circuit 40 and the controlling circuit 60 may be provided on the side of the stage operating device 3. Alternatively, the rotation signal outputting mechanism is not the DC motor 16 but may be a tacho-generator. Alternatively, the coarse movement handle 12 is provided with a piezoelectric element, and whether or not the coarse movement handle 12 is operated may be detected by this piezoelectric element. In this case, the discriminating circuit 40 is simplified and judges only whether or not an output is given from the piezoelectric element.

Further, if the stage operating device 3 is so constructed as to be attachable to and detachable from the microscope body 1, two sets of rotation detecting devices for detecting respectively a rotation of the fine movement shaft and a rotation of the coarse movement shaft.

Also, the microscope body 1 and the stage operating device 3 may be connected to each other not through the connector 19 and the contact point boards 30, 31 but by wireless or by wire. Moreover, the connector 19 is disposed in the central position P of the drum body 13, and the contact point boards may be united into one board. In this case, a direction discriminating device for judging whether the stage operating device 3 is installed in a predetermined position or in a position to which the predetermined position is inverted through approximately 180 degrees, is provided in both of the stage operating device 3 and the microscope body 1. Then, there is provided a distributing circuit for properly distributing the signals inputted to a plurality of input terminals, to the controlling circuit 60 and the discriminating circuit 40 in accordance with a result of judgement by the direction discriminating device. The signal can be thereby adequately transmitted from the stage operating device 3 to the microscope body 1.

What is claimed is:

1. An electrically-driven coarse and fine movement apparatus comprising:
   a movable member;
   a driving device for driving said movable member;
   a first operation handle;
   a first rotary shaft fixed to said first operation handle;
   a second operation handle, disposed coaxially with said first operation handle, for rotating said first rotary shaft;
   a rotation restricting member for restricting a rotation of said second operation handle, which is accompanied with the rotation of said first operation handle;
   a rotation detector for detecting a rotational quantity and a rotational direction of said first rotary shaft;
   a discriminating device, linked to said second operation handle, for judging whether said second operation handle is operated or not to output a judging signal; and
   a controlling circuit for controlling said driving device so as to provide said movable member with a coarse movement in accordance with an operation of one operation handle of said first and second operation handles and to provide said movable member with a fine movement in accordance with an operation of the other handle by judging whether the operation is a drive operation by said first operation handle or by said second operation handle on the basis of a detection signal from said first rotation detector and the judging signal from said discriminating device.

2. The electrically-driven coarse and fine movement apparatus according to claim 1, further comprising:
   a second rotary shaft disposed coaxially with said first rotary shaft and fixed to said second operation handle; and
   a linkage member for rotating said first operation handle with the rotation of said second operation handle,
   wherein said discriminating device is linked to said second rotary shaft and judges whether or not said second rotary shaft is rotated.

3. The electrically-driven coarse and fine movement apparatus according to claim 2, wherein said movable member is any one of a stage of a microscope or a revolver for holding an objective lens, said driving device moves said stage or said revolver in an optical-axis direction of said objective lens, said first and second operation handles are provided on said microscope body, said first operation handle is provided at each of both end portions of said first rotary shaft, and said second operation handle is provided at one end portion of said second rotary shaft.

4. The electrically-driven coarse and fine movement apparatus according to claim 3, further comprising:

an operation unit having said first and second operation handles, said first and second rotary shafts, said rotation detector and said discriminating device, said operation unit being attachable to said microscope body in any one of a first direction and a second direction that rotate through 180 degrees.

5. An electrically-driven coarse and fine movement operating unit comprising:

a first operation handle;

a first rotary shaft fixed to said first operation handle;

a second operation handle, disposed coaxially with said first operation handle, for rotating said first rotary shaft;

a rotation restricting member for restricting a rotation of said second operation handle, which is accompanied with the rotation of said first operation handle;

a rotation detector for detecting a rotational quantity and a rotational direction of said first rotary shaft;

a discriminating device, linked to said second operation handle, for judging whether said second operation handle is operated or not to output a judging signal; and an output terminal for outputting a detection signal from said rotation detector and the judging signal from said discriminating device.

6. An electrically-driven microscope comprising:

a stage;

a revolver for holding an objective lens;

a driving device for moving at least one of said stage and said revolver in an optical-axis direction of said objective lens; and an operation unit attachable to and detachable from said microscope body, said operation unit comprising:

a coarse movement operation handle;

a fine movement operation handle;

a detecting device for detecting respectively an operation of said coarse movement operation handle and an operation of said fine movement operation handle, and outputting a detection signal indicating a piece of operation information;

an outputting unit for outputting a signal from said detecting device;

an inputting unit provided in said microscope body and connected to said outputting unit when said operation unit is attached to said microscope body; and a controlling circuit for controlling a drive of said driving device on the basis of a signal inputted to said inputting unit.

7. The electrically-driven microscope according to claim 6, wherein said operation unit has both of said coarse movement operation handle and said fine movement operation handle on one side thereof in its longitudinal direction and is attachable to said microscope body in any one of a first direction and a second direction that rotate through 180 degrees.

8. The electrically-driven microscope according to claim 7, wherein said inputting unit has a first inputting portion connected to said outputting unit when said operation unit is attached to said microscope body in the first direction, and a second inputting portion connected to said outputting unit when attached to said microscope body in the second direction.

9. The electrically-driven microscope according to claim 8, further comprising:

a direction detecting device for detecting which of the first direction and the second direction said operation unit is attached in.

10. The electrically-driven microscope according to claim 7, wherein said operation unit further comprising:

a rotary shaft rotating even when any one of said coarse movement operation handle and said fine movement operation handle rotates;

a rotation detector for detecting a rotational quantity and a rotational direction of said rotary shaft;

a rotation restricting member for restricting a rotation of said coarse movement operation handle, which is accompanied with the rotation of said fine movement operation handle;

a discriminating device, linked to said coarse movement operation handle, for judging whether said coarse movement operation handle is operated or not, and outputting a judging signal;

said outputting unit for outputting a signal from said rotation detector and the judging signal from said discriminating device; and said controlling circuit for controlling said driving device so as to reverse a moving direction of said stage with respect to a rotating direction detected by said rotation detector, depending on a time when said operation unit is attached in the first direction and a time when attached in the second direction.

* * * * *